Nov. 24, 1953  L. F. WHITNEY ET AL  2,660,163
HOT-WATER GENERATOR AND STORAGE SYSTEM
Filed Jan. 17, 1951  6 Sheets-Sheet 1
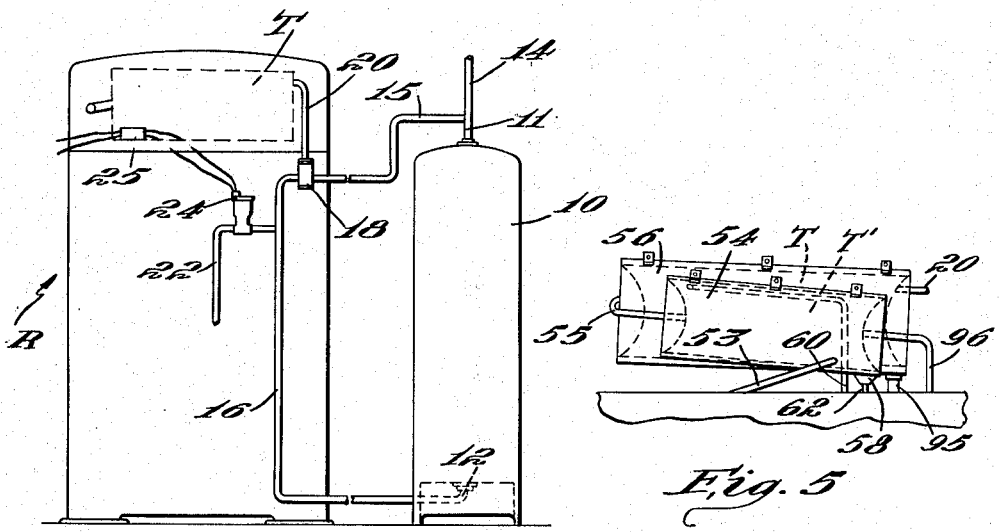
Fig.1
Fig.5
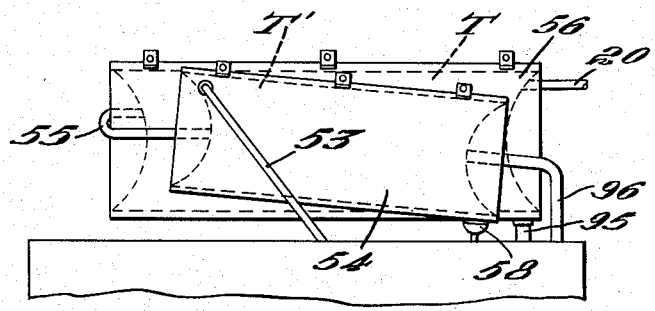
Fig.3
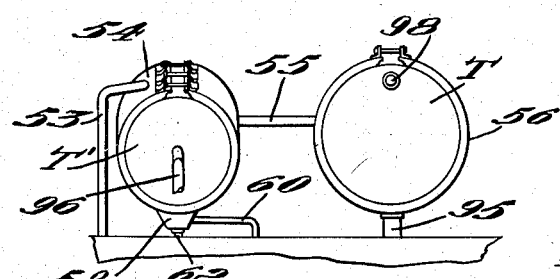
Fig.4
Inventors
Lyman F. Whitney
William F. Whitney
Daniel F. Comstock
by Roberts, Cushman & Grover
Att'ys.

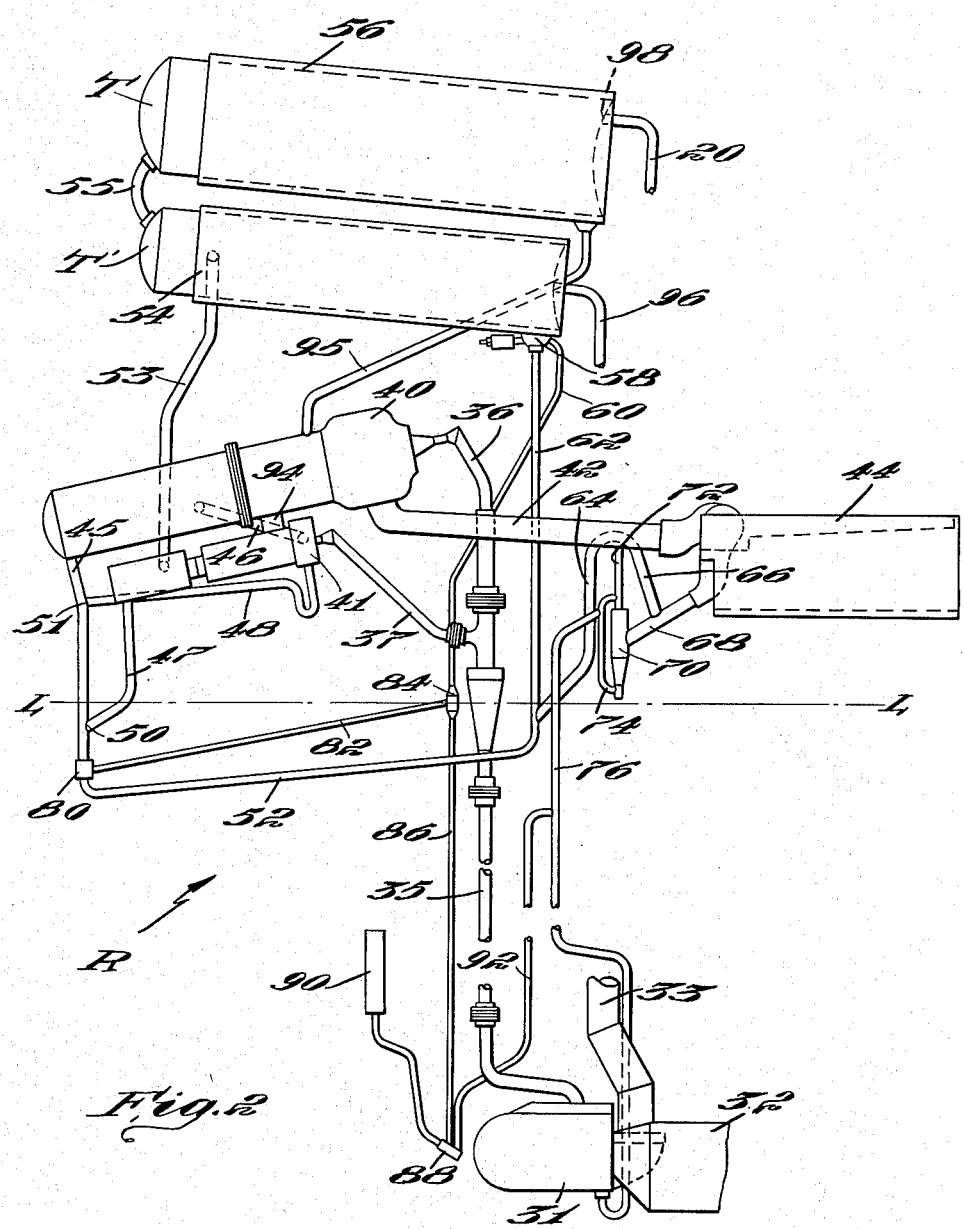

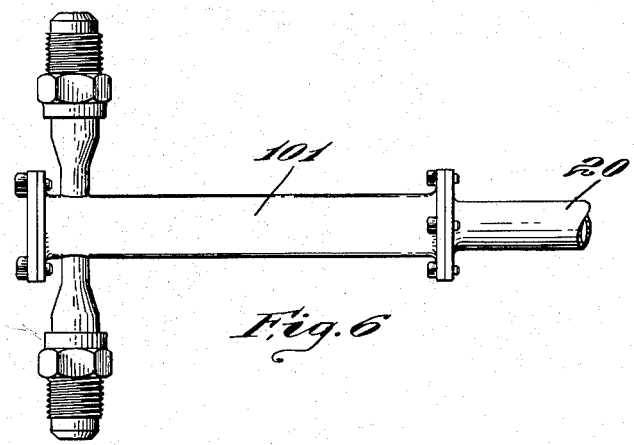
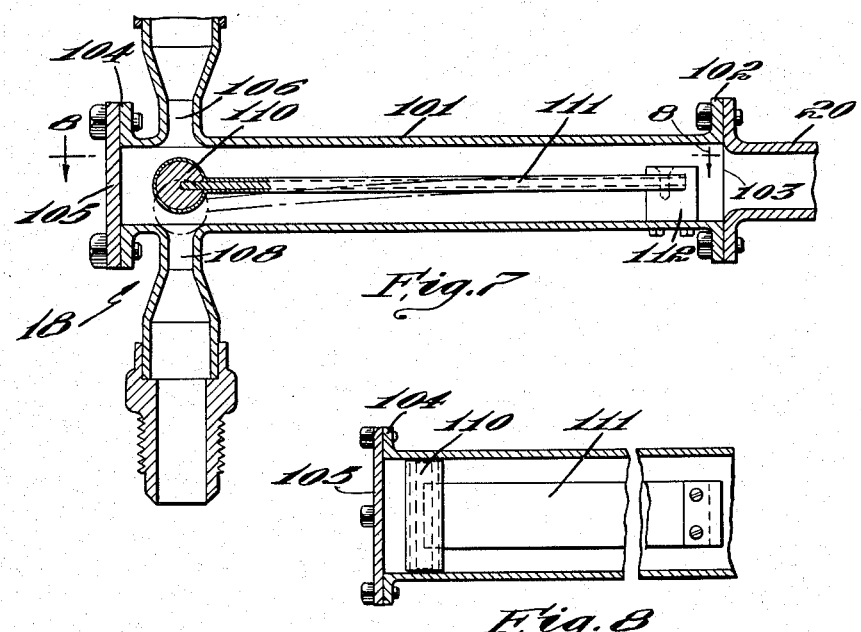
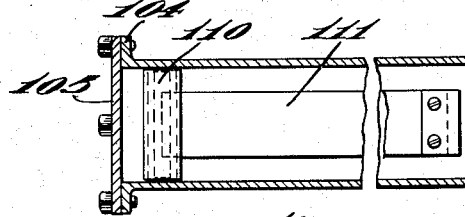

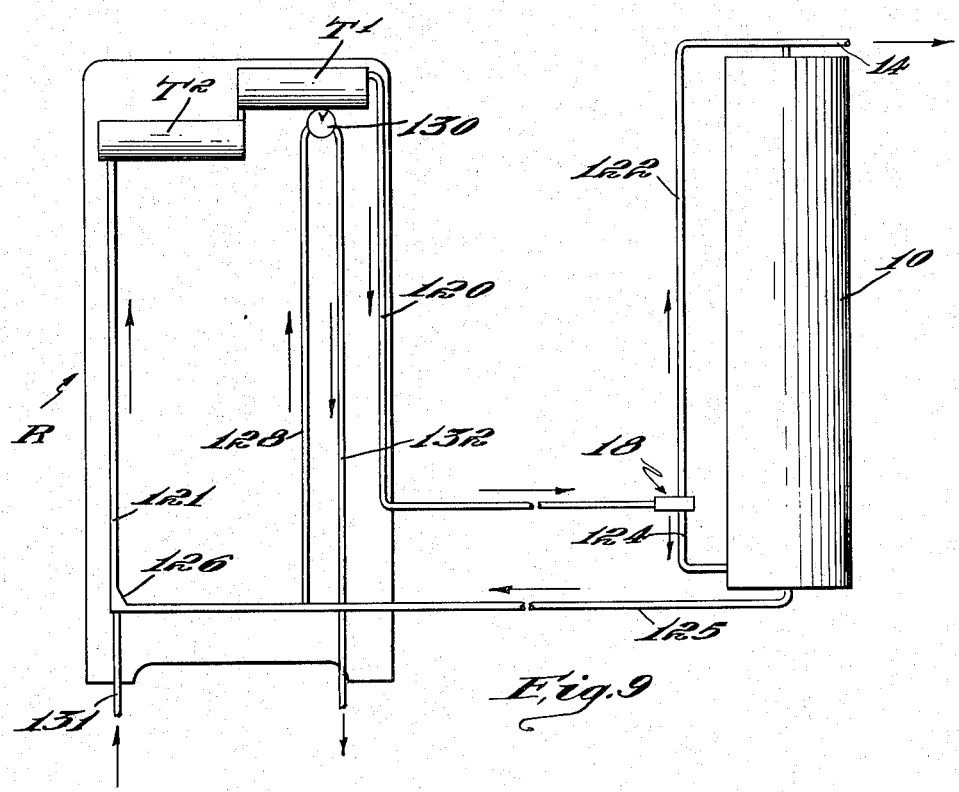
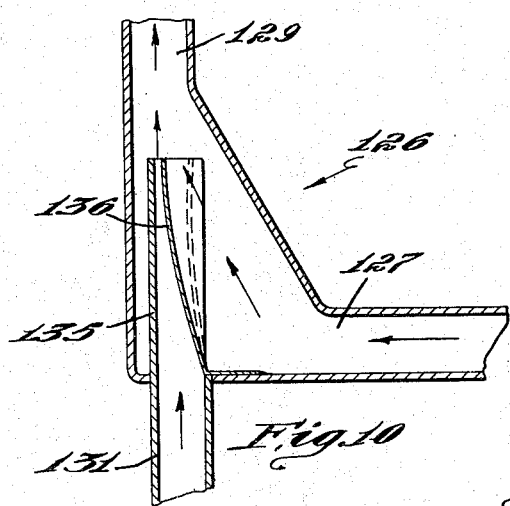

Nov. 24, 1953 L. F. WHITNEY ET AL 2,660,163
HOT-WATER GENERATOR AND STORAGE SYSTEM
Filed Jan. 17, 1951 6 Sheets-Sheet 6

Inventors
Lyman F. Whitney
William E. Whitney
Daniel F. Comstock
by Roberts, Cushman & Grover
Att'ys.

Patented Nov. 24, 1953

2,660,163

UNITED STATES PATENT OFFICE 2,660,163

HOT-WATER GENERATOR AND STORAGE SYSTEM

Lyman F. Whitney, Boston, William E. Whitney, Belmont, and Daniel F. Comstock, Lincoln, Mass., assignors to Comstock & Wescott, Inc., Cambridge, Mass., a corporation of Massachusetts Application January 17, 1951, Serial No. 206,501

7 Claims. (Cl. 126—362)

This invention relates to a hot water system associated with a substantially continuous hot water generator of relatively low heat generating capacity, the present application being a continuation-in-part of our copending application, Serial No. 755,776, filed June 1947, now United States Patent No. 2,544,408 granted March 6, 1951.

The installation of a combined refrigerator and hot water system such as is shown in U. S. Patent No. 2,174,302, granted December 26, 1939, and our above identified application requires a relatively expensive tank which unnecessarily duplicates storage facilities already possessed by a great number of prospective users. It is the principal object of the invention to modify the aforementioned system so that it may be connected to a conventional hot water storage tank in a simple, inexpensive and expeditious manner, which does not necessarily require alteration work on existing installations or modification of the conventional storage tank, and which is not wasteful of heat or water. Further objects will be apparent from consideration of the following description and the accompanying drawings, wherein:

Fig. 1 is an elevational view of our improved system;

Fig. 2 is a diagrammatic view of the combination refrigeration unit and associated water heating system;

Figs. 3 and 4 are side elevations of one form of water heating tank;

Fig. 5 is a side elevation of a modified form of water heating tank;

Fig. 6 is an elevation of the automatic switching valve;

Fig. 7 is an enlarged section through the valve shown in Fig. 6;

Fig. 8 is a section on the line 8—8 of Fig. 7;

Fig. 9 is an elevational view, similar to Fig. 1, of a modified system;

Fig. 10 is an enlarged longitudinal section through the injector embodied in the system shown in Fig. 9;

Figure 11:
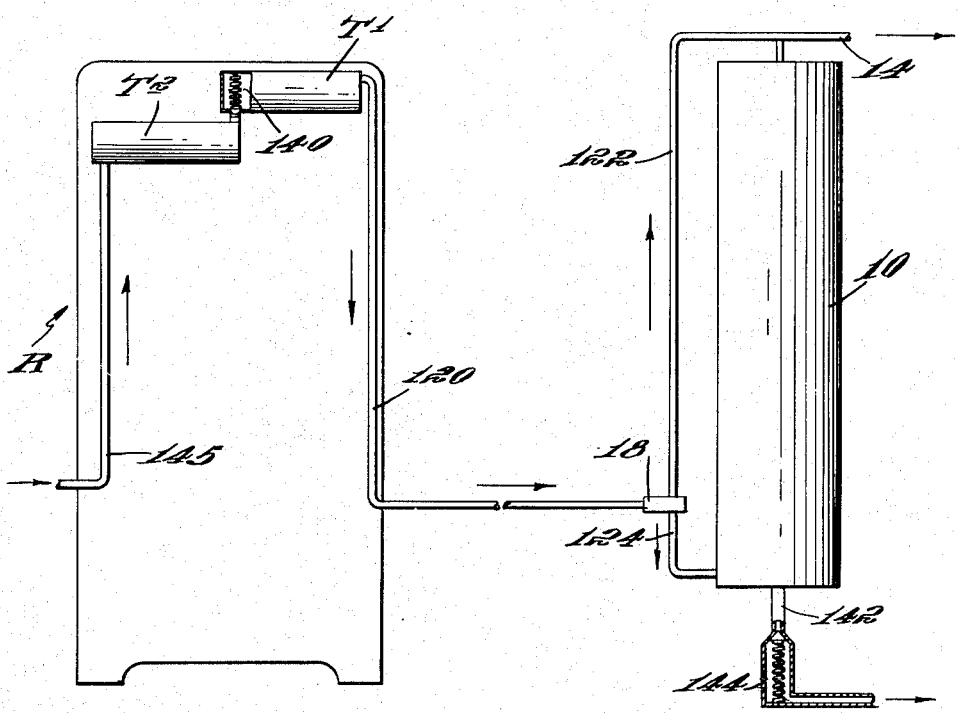
Figs. 11 and 12 are elevations illustrating further modifications.

In accordance with the present invention, our hot water system is associated with a substantially continuously operating hot water generator having a cold water inlet and a hot water outlet which may advantageously be of the type disclosed in the copending application of L. F. Whitney, Serial No. 749,661, filed May 22, 1947, now Patent No. 2,562,651, granted July 31, 1951, although it is to be understood that various other types of hot water generators may be used. The hot water system comprises a suitable reservoir such as a conventional domestic hot water storage tank which is preferably capable of receiving and storing the output of the hot water generator over a period of eight hours or more, the storage tank being provided with a hot water inlet or duct at its upper part and a hot water discharge line, a cold water or lower temperature duct or vent and a waste discharge port both connected with its lower part.

The hot water generator is associated with a thermostatic actuating means operative directly or otherwise to initiate or effect admission of cold water to the generator and the opening of the drain line. To this end suitable means, such as a switching valve operative to deflect hot water through one outlet and cool water through another outlet, and a plurality of associated conduits interconnect the hot water outlet of the generator, the hot water inlet of the storage tank, the lower temperature duct and the waste line, so that when a predetermined temperature condition is reached in a selected part of the system (usually the hot water generator), the thermostatic element acting usually in conjunction with the switching valve, initiates either directly or indirectly the opening of the waste line, thereby simultaneously passing cool water from the lower part of the storage tank, transferring hot water to the upper part of the storage tank, and admitting cold water to the generator.

With this construction and arrangement hot water may normally pass from the generator to the storage tank or to the hot water discharge line when the latter is open, but if the hot water demand should slacken or cease for any appreciable period of time, then as the generator continues to operate, the hot water therein is periodically automatically transferred to the storage tank in the manner above described. Hence the generator may be set for efficient operation and then be operated continuously as desired without danger of overheating or undue waste of water or heat.

Such a system, particularly when associated with a hot water generator constituting a part of a refrigerating apparatus of the aforementioned type, may advantageously be employed in homes and establishments which not only require continuous refrigeration, but also periodically consume appreciable quantities of hot water. In such installations, the system may be designed so that sufficient hot water will be generated and stored during the periods between demand to take care of the major portion if not the entire hot water requirements, the pre-existing storage capacity being augmented by the volume afforded by the generator.

Various combinations of the above elements may be designed to obtain the desired action, and such combinations may embody electrical and/or fluid-operated parts, as may appear more fully from the following description of illustrative embodiments.

Referring to Figs. 1 and 2, the system shown therein comprises a refrigerating apparatus R having condenser tanks T and T' which, as hereinafter explained, constitute a part of the hot water generator, and a conventional hot water storage tank 10 which is provided with a high temperature duct 11 at its upper part and a lower temperature duct 12 at its lower part, the latter not only providing an inlet for cool water, but also a waste discharge line. The duct 11 is connected by a T to a hot water discharge line 14 and a hot water supply line 15, and the duct 12 is connected by a line 16 to one outlet of a switching valve 18, the other outlet of which is connected to the line 15. The inlet port of switching valve 18 is connected to the hot water outlet of tank T by a line 20 and adjacent to the connection of line 16 with valve 18, is a branch or waste line 22 having a waste valve 24 operated by a thermostat 25 here shown associated with the tank T.

The refrigerating apparatus R comprises a boiler 31 having a suitable heater such as a gas burner assembly 32 and a draft-inducing flue 33, only a portion of which is shown. Mercury vapor passes from the boiler 31 upwardly through a riser 35 to branches 36 and 37 which are connected, respectively, to the first and second stage ejectors 40 and 41 of a multiple stage ejector. The first stage aspirator 40 is connected by a vapor duct 42 to a cooler or evaporator 44 which contains a body of aqueous refrigerant in which a suitable antifreeze agent is dissolved. The vapor is drawn through the duct 42 to the mixing chamber of the first stage aspirator and the mixed mercury and refrigerant vapors are passed through the aspirator where the refrigerant is compressed and the greater part of the mercury condensed.

The condensed mercury flows from a first stage aspirator into a drain 45 while the compressed vapor passes through a duct 46 to the second stage aspirator 41 into which a second stream of mercury vapor flows from the line 37, this latter propellant stream causing a further compression of the refrigerant vapor in the second stage aspirator. Drains 47 and 48 receive the condensed mercury from the second stage aspirator and the two drains join the drain 45 at 50 and 51 respectively. The drain 45 is connected to an inclined line 52 which is normally filled with mercury.

The compressed refrigerant passes upwardly from the second stage aspirator through a duct 53 to the refrigerant condenser 54 consisting of a jacket surrounding the tank T' which is interconnected with the tank T by line 55. The tank T is likewise surrounded by a condenser jacket 56 for the heat-transfer fluid (hereinafter described).

A chamber or drum 58 is located at the end of the condenser jacket 54 remote from the inlet line 53 and one end of a purger pipe 60 communicates with the drum 58 so as to receive non-condensible gases therefrom. The lower part of this drum is connected with a drain or refrigerant return pipe 62 through which the condensed refrigerant passes on its way back to the cooler 44.

As a general rule, the vapor inlet line 53 is preferably connected to the upper part of the condenser jacket 54 and the purger pipe 60 to the drum 58, where the non-condensible gases usually accumulate, as illustrated in Figs. 3 and 4. However, under certain operating conditions conducive to the accumulation of non-condensible gases in the upper part of the condenser jacket, the vapor inlet line 53 may be connected to the lower part and purger line 60 may draw from the upper part of jacket 54, as illustrated in Fig. 5.

The lower end of the return pipe 62 is connected with the one leg 64 of an inverted U-tube, the other leg 66 of which is connected to the central part of an inclined sludge drain 68 extending downwardly from the cooler 44, the construction and arrangement of parts being such that the refrigerant standing in the line 62 pushes through the mercury at the junction with the leg 64 to work its way back to the evaporator or cooler 44.

The lower end of the drain 68 is connected to a sludge drum 70, the upper end of which is connected by a line 72 to the vapor duct 42 and the lower end of the sludge drum is connected by a line 74 to both the mercury return 76 and the line 72, the construction and arrangement of parts being such that sludge in the drum 70 is subjected to the action of the low pressure in the duct 42 so as to evaporate the aqueous component and permit particles of mercury to coalesce and eventually work back through the line 74 to the return line 76.

Adjacent to the junction of the drains 45 and 52 is a fitting 80 connected with the lower end of an upwardly inclined spill-over line 82 the upper end of which is connected with the purger line 60 at 84, which connection determines the normal mercury level L of the system. The spill-over line 82 and the line 60 connect at 84 with a mercury pump 86 comprising a capillary tube in which drops or slugs of mercury run down, trapping non-condensible gases drawn from the drum 58 and compressing them to more than atmospheric pressure. The lower end of the capillary tube is connected with an inclined fitting or pipe line 88, the upper end of which is provided with a vent cap 90 open to the atmosphere and the lower end of which is connected to a return branch 92 which in turn is connected to the return line 76. With this construction and arrangement the parts 86, 88 and 92 provide a trap of mercury which permits the entrapped gases carried down and compressed by the mercury to rise in the line 88 and escape through the vent cap 90 while the mercury returns through the lines 92 and 76 to the boiler 31.

Both the aspirators 40 and 41 are provided with cooling jackets interconnected with each other by a duct 94 and the first stage aspirator 40 is connected with the lower end of a cooling line or riser 95, the upper end being connected with the jacket 56 about the tank T. The tank T' is provided with a cold water inlet 96 and the tank T is provided with a hot water outlet 98 which is connected to the hot water supply line 20.

During normal operation of the refrigerating apparatus water in the tank T' is heated by the condensation of the aqueous refrigerant vapors discharged through the line 53 into jacket 54, and the water tank T is heated to a higher temperature by the heat-transfer fluid in the jacket 56. Since the two tanks are interconnected by pipe 55, water drawn from the tank T through line 20 is replenished by preheated water passing from the tank T' through pipe 55, and at the same time cold water is admitted to the tank T' through line 96.

The switching valve 18, as shown in Figs. 6 to 8, comprises a casing 101 of substantially rectangular cross-section and formed at one end with an attaching flange 102 defining an inlet port 103. The opposite end of the casing 101 is formed with a flange 104 which carries a closure plate 105 and adjacent to the latter end opposite walls of the casing are formed with aligned discharge ports 106 and 108 connected by adapters to pipes 16 and 15, respectively. A generally cylindrical valve member 110 is mounted on the free end of a bi-metallic strip or arm 111 so that when swung in one direction it opens one port and tends to close the other, and vice versa, as indicated by the dot and dash lines of Fig. 7. The other end of the arm 111 is anchored to a block 112 secured to an inner wall of the casing 101. The design is such that if the temperature of water passing through the inlet port 102 is above a prescribed value, such as 150° F., then the bi-metallic arm 111 will swing so that the valve member 110 blocks the discharge port 106, thus shutting off communication with line 16 and causing the hot water to flow directly to the upper part of the storage tank 10 or discharge line 14; but should the temperature of the water drop below this value, then the arm 111 swings the valve member 110 in the opposite direction so as to open port 106 and at least partially close port 108, thus diverting the water through line 16 to the lower part of the storage tank 10.

The valve 24 may be a conventional thermostatically-operated type, and is here shown as being a normally closed solenoid valve associated with a thermostatic switch 25 disposed in heat transfer relation to the lower part of tank T. Hence, when water in the tank T becomes heated to a predetermined temperature the thermostatically operated switch 25 closes the circuit of the solenoid of waste-valve 24 thereby operating the valve to open line 22. The valve 24 remains open until a drop in temperature of the water in tank T causes the thermostatically operated switch 25 to open the circuit, thereby closing waste valve 24 and line 22. The opening of the valve 24 only takes place when the water in tank T is hot enough so that on reaching the switching valve 18, the latter closes communication with the line 16 and hence water from the lower part of the storage tank 10 flows through line 16 and out through the waste line 22, while hot water from the tank T passes into the upper part of the storage tank 10 and at the same time cold water is admitted through inlet 96 to the tank T' to replace that drawn from the tank T, the pressure of the inlet water effecting the flow thus described.

So long as the water coming from tank T is at or above the prescribed minimum temperature the switching valve 18 closes the port communicating with line 16. Hence when a hot water faucet is opened and water is drawn through the discharge line 14, it normally comes directly from the tank T. If the demand were such that the hot water in the tank T became exhausted, or if its temperature dropped below the prescribed minimum, then the water flowing through the line 20 would cause the bi-metallic arm 111 of switching valve 18 to open port 106, thus diverting water to the bottom of the storage tank 10, in which event water drawn from a faucet in the discharge line 14 comes from the top of the storage tank. Between periods of demand water in the tanks T and T' is continuously being heated and periodically passed into the top of the storage tank 10, simultaneously with admission of the cold water to the tank T' and discharge of water from the bottom of the storage tank 10 through the line 16 to the waste line 22. The single line 16 thus performs two functions, viz., a conduit for diverting cold water to the bottom of the storage tank 10, and a conduit for conducting waste water from the storage tank 10 to the waste line 22.

It will be observed that in addition to the above noted advantages our improved apparatus may be readily connected to a conventional hot water supply tank simply by extending the cold water line to the inlet pipe 96 of the refrigerating apparatus, connecting the usual top and bottom ports of the storage tank with the hot and cold water ports of the switching valve 18, and connecting the discharge port of the dump valve 24 to any convenient drain or point of disposal for the waste water. Such connections can usually be made with little or no breaking of walls or cutting of floors, and hence the cost of installation is but of minor consideration.

Although the foregoing system presents what is now considered the most simplified and efficient arrangement, various modifications embodying their own advantageous features may be made and the embodiments presently to be described are illustrative of such modifications.

The embodiment shown in Figs. 9 and 10 is designed to economize water wastage by using the injector action of a small inlet jet to move cool water from the bottom of the storage tank to the heating tanks of the refrigerating apparatus, but in all material particulars the system is like the previously described embodiment and the same or similar reference characters are applied to corresponding parts. In this embodiment the refrigerating apparatus is provided with tanks T-1 and T-2 corresponding to the tanks T and T' of the previously described embodiment, the tank T-1 having a hot water outlet connected with the inlet port of switching valve 18 by pipe 120 and the tank T-2 having an inlet connected with a cold water supply pipe 121. The high temperature port of valve 18 is connected to a line 122 which has a T connection with the upper part of the storage tank 10 and hot water discharge line 14, and the lower temperature port of valve 18 is connected to the lower part of tank 10 by line 124.

The bottom of the storage tank is connected with the cold water supply line 121 and water main 131 by line 125 which includes an injector fitting 126, and between the fitting 126 and tank 10 there is connected into line 125, a constricted waste line 128 which includes a thermostatically-operated valve 130 associated with tank T-1 so that the valve opens when water at the bottom part of the tank reaches a prescribed temperature. The outlet port of valve 130 is connected to a drain or waste line 132 which leads to any suitable point of disposal of waste water.

The injector 126 comprises a housing, shown in Fig. 10, having a suction port 128 connected to the line 125, a discharge port 129 connected with supply line 121 and a pressure supply port which receives a rectangular nozzle 135 connected with water main 131, the nozzle 135 having a variable discharge opening by reason of one face 136 being of resilient metal, extending into converging relation to the opposite face, and flexing between two parallel adjacent faces of the nozzle. The construction and arrangement are such that when there is little or no pressure difference between the interior and exterior of the nozzle 135, as when a small flow of water is being wasted through line 128, the end of the flexible face 136 is in closely spaced relation to the opposite face or wall thereby to provide a narrow orifice as shown by the full lines of Fig. 10; but when the pressure difference is increased, as by the opening of a faucet connected to line 14, the flexible face 136 is flexed outwardly, as indicated by the broken lines of Fig. 10, so that a full flow of water takes place at nearly the full pressure of the supply main.

In operation, the thermostatic valve 130 is set to open at a predetermined temperature, for example 170° F., and when the water in the tank T-1 reaches this temperature the valve 130 opens and wastes a small trickle of cold water to the drain. This water is replaced from the cold water inlet 131 through the injector 135 which for small flow remains at minimum opening, thereby to impart enough momentum to water passing through the feed line 121 to aspirate cold water from the bottom of the storage tank 10 into the tank T-2. This displaces hot water from the tank T-2 and transfers it, via the switching valve 18, to the top of the storage tank 10; and this action continues until the water in the tank T-1 is cooled below the prescribed temperature at which times the valve 130 closes and arrests further circulation. When the discharge line 14 is open, the decrease in pressure permits incoming water to open the spring-controlled face or wall 136 so that a full flow of water enters with the pressure dropping only a few pounds.

The embodiment shown in Fig. 11 eliminates the necessity of using a return pipe by maintaining the pressure in the hot water system slightly lower than that in the supply line, except when water is being dumped. In this embodiment the connection between the tanks T-1 and T-2 is provided with a throttling valve 140 loaded with a bi-metal spring, and the drain or waste line 142 leading from the bottom of the storage tank 10 is provided with a weight- or spring-loaded valve 144 set to allow a slow flow of water to pass to the drain from the storage tank 10 only when the pressure therein approximates that in the supply line 145.

In all other material particulars the system is substantially the same as that of Figs. 9 and 10. In operation, the valve 140, governing the cold water inlet, has no positively closed position, but merely reduces pressure in the hot water system below the operating pressure of the drain valve 144 when the temperature in the tank T-2 is below the prescribed minimum, say 170° F. When this temperature is attained or exceeded, the bi-metallic element causes the valve 140 to open and hence the pressure rises to that of the line 145, thus causing the drain valve 144 to open so as to allow a slow waste of cold water from the bottom of the storage tank 10 until the temperature of the water in the tank T-2 is below 170° F. The opening of a faucet in the hot water supply line 14 reduces pressure in the system by a few pounds, but the spring-loaded valve 140 is not effective to prevent cold water from entering tank T-2 from line 145, nor even to lower the pressure substantially.

Figure 12:
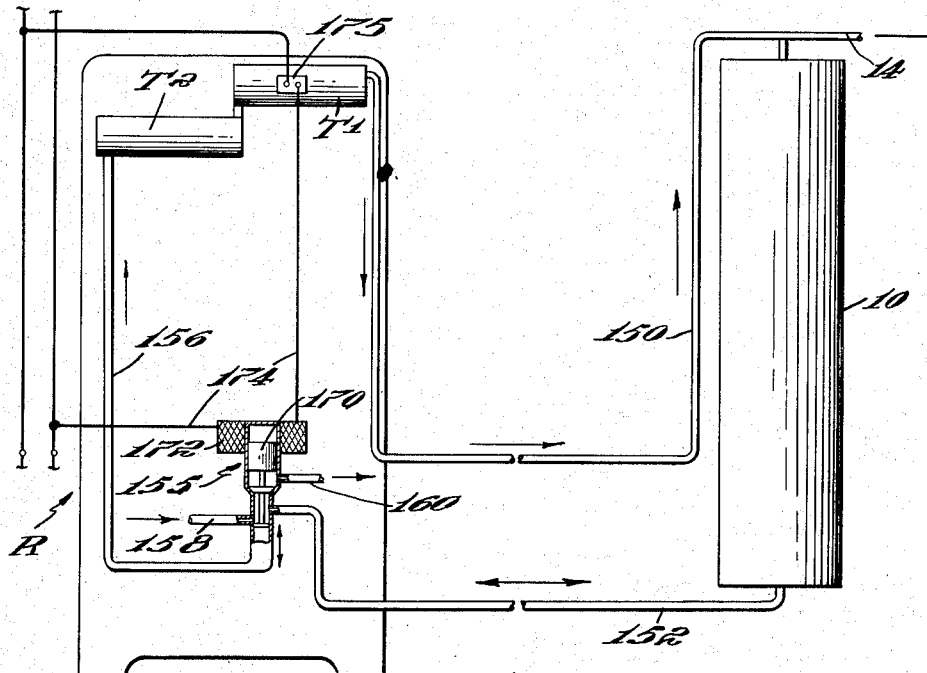

The embodiment shown in Fig. 12 is electrically operated and dispenses with the use of the particular type of switching valve common to the previously described embodiments. In this embodiment the tanks T-1 and T-2 are interconnected and the tank T-1 is directly connected to the upper part of the storage tank 10 by a line 150. The bottom of the storage tank 10 is connected by a line 152 with port $a$ (Fig. 13) of a double acting electromagnetic switch valve 155, Fig. 13, and the inlet port of the tank T-2 is connected by line 156 with port $b$ of the same valve. The remaining ports $c$ and $d$ are respectively connected to the cold water supply line 158 and waste line 160.

Within the cylindrical body 161 (Fig. 13) of the valve 155 and between the ports $a$ and $d$ is a valve seat 162 for a valve head 164 carried by stem 165. The stem 165 projects beyond the head 164 and carries a piston-like member 166 positioned between the ports $b$ and $c$ when the valve head 164 is seated. The opposite end of the valve stem 165 carries an armature 170 slidable within the body of the valve from a normal or dropped position (wherein gravity holds the valve head 164 seated so that only ports $a$ and $c$ are interconnected, as shown by the solid lines of Fig. 13) to an elevated position, wherein the port $b$ is connected with port $c$ and port $a$ is connected with port $d$. The armature 170 is operated by a solenoid 172 in a circuit 174 controlled by a normally opened thermostatic switch 175 associated with tank T-1.

Figure 13:
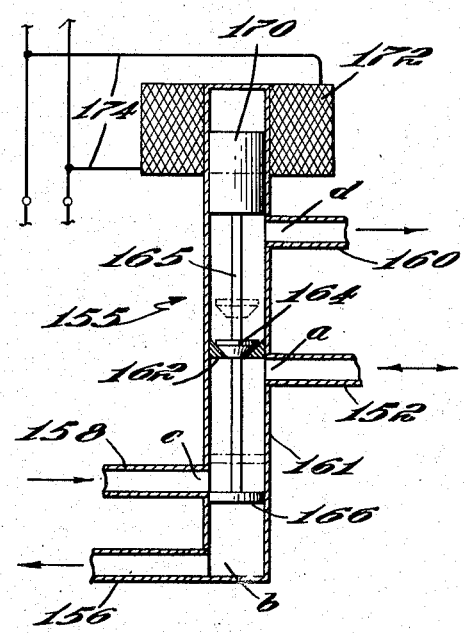
Fig. 13 is an enlarged section of the switching valve embodying the system shown in Fig. 12.

In operation, when the temperature of the water in the tank T-1 is below a prescribed minimum, say 170° F., the switching valve 155 is as shown in Fig. 13, wherein ports $a$ and $c$ are connected so that water from the supply line 158 may flow into the line 152 leading to the bottom of the storage tank 10. Hence, opening the discharge line 14 draws water from the top of the tank 10 which is replenished by water entering the bottom of the tank through line 152. When the temperature of the water within the tank T-1 reaches 170° F., the thermostatic switch 175 closes the circuit through the solenoid 172 which lifts the valve stem 165 to the position shown by the dotted lines of Fig. 13, in which position the line 152 leading from the bottom of the storage tank 10 is connected to the drain or waste line 160, so that water from the bottom of storage tank 10 is passed to the drain, thereby permitting hot water in tank T-1 to enter the upper part of the storage tank 10 through line 150 and cold water in the supply line 158 to flow through the line 156 to the tank T-2 to replace the water drawn from the tank T-1. When the temperature in the tank T-1 drops below 170° F., the thermostatic switch 175 opens, deenergizing the solenoid 172 to permit the valve stem to drop back by gravity to retracted position.

While we have shown and described different desirable embodiments of the invention, it is to be understood that various changes and modifications may be made without departing from the spirit and scope of the invention as set forth in the following claims.

We claim:

1. A hot water system comprising a hot water generator having a cold water inlet and a hot water outlet, a storage tank having a high temperature duct connected with its upper part and a lower temperature duct connected to its lower part, thermostatic actuating means associated with said generator and operative to initiate admission of water to said cold water inlet in response to a predetermined temperature, a waste line, conduits connecting said hot water outlet and high temperature duct and said lower temperature duct and waste line, and a switching valve connected to one of said conduits and conjointly operative with said thermostatic actuating means automatically to pass hot water from said generator to said high temperature duct and simultaneously pass colder water from said tank through said lower temperature duct to said waste line.

2. A hot water system comprising a hot water generator having a cold water inlet and a hot water outlet, a storage tank having a high temperature duct connected with its upper part and a lower temperature duct connected to its lower part, thermostatic actuating means associated with said generator and operative to initiate admission of water to said cold water inlet in response to a predetermined temperature, a waste line, conduit means connecting said hot water outlet with said high temperature duct, a switching valve, and conduits interconnecting said switching valve, lower temperature duct and waste line so that hot water passes directly from said generator to the upper part of said tank and simultaneously water passes from the lower part of said tank to said waste line in response to operation of said thermostatic actuating means.

3. A hot water system comprising a hot water generator having a cold water inlet and a hot water outlet, a storage tank having a high temperature duct connected with its upper part and a lower temperature duct connected to its lower part, a switching valve having an inlet port, two outlet ports and a valve member for opening and closing the outlet ports in accordance with the temperature of water passing therethrough, a conduit connecting said hot water outlet and inlet port, a second conduit connecting said high temperature duct and the higher temperature outlet port, a third conduit connecting said lower temperature duct and the lower temperature outlet port, a waste line connected to said third conduit, and a normally closed thermostatically operated valve in said waste line responsive to the temperature of water in a predetermined part of the system to open said waste line, thereby to discharge water from the lower part of said tank through said third conduit and simultaneously effect admission of water through said second conduit to the upper part of said tank.

4. A hot water system comprising a hot water generator having a cold water inlet and a hot water outlet, a storage tank having a high temperature duct connected with its upper part and a lower temperature duct connected to its lower part, a switching valve having an inlet port, two outlet ports and a valve member for opening and closing the outlet ports in accordance with the temperature of water passing therethrough, a conduit connecting said hot water outlet and inlet port, a second conduit connecting said high temperature duct and the higher temperature outlet port, a third conduit connecting said lower temperature duct and the lower temperature outlet port, a waste line connected to said third conduit at a point adjacent to said switching valve so that said third conduit is operative to convey water both to and from said tank, a normally closed dump valve in said waste line, and thermostatically operated dump valve-actuating means associated with said generator and operative in response to a predetermined temperature therein to open said waste line, thereby to discharge water from the lower part of said tank through said third conduit and simultaneously effect admission of water through said second conduit to the upper part of said tank.

5. A hot water system comprising a hot water generator having a cold water inlet and a hot water outlet, a supply line connected with said cold water inlet, a storage tank having a high temperature duct connected with its upper part and a lower temperature duct connected to its lower part, a switching valve having an inlet port, high and low temperature outlet ports, and a valve member for opening and closing the outlet ports in accordance with the temperature of water passing therethrough, a conduit connecting said hot water outlet and the inlet port, a second conduit connecting said high temperature duct and the high temperature outlet port, a third conduit connecting said lower temperature duct and the low temperature outlet port, a waste line having a connection with the lower part of said tank, and a normally closed thermostatically operated dump valve in said waste line responsive to the water temperature in said generator to open the waste line, and an injector device connected with said waste line and the supply line and operative to entrain water from the lower part of said storage tank and pass both the entrained water and fresh incoming water to said generator when said dump valve operates.

6. A hot water system comprising a hot water generator having a cold water inlet and a hot water outlet, a storage tank having a high temperature duct connected with its upper part and a lower temperature duct connected to its lower part, a switching valve having an inlet port, high and low temperature outlet ports and a valve member for opening and closing the outlet ports in accordance with the temperature of water passing therethrough, a conduit connecting said hot water outlet and said inlet port, a second conduit connecting said high temperature duct and the high temperature outlet port, a third conduit connecting said lower temperature duct and the low temperature outlet port, a waste line having a connection with the lower part of said tank, a spring-loaded thermostatically operated normally closed valve controlling the flow through said cold water inlet, and a spring-loaded valve in said waste line operative to hold it closed when the pressure in said tank is less than a predetermined value, whereby the opening of the thermostatic valve in response to temperature conditions admits water to said generator with consequent increase of pressure within said tank so that water passes therefrom through said waste line.

7. A hot water system comprising a hot water generator having a cold water inlet and a hot water outlet, a storage tank having a high temperature duct connected with its upper part and a lower temperature duct connected to its lower part, a conduit connecting the outlet of said generator with the high temperature duct of said tank, a switching valve having four ports and valve members operative to interconnect the ports, a second conduit connecting the lower part of said tank with one of said ports, a waste line connected with a second port, a third conduit connecting a third port with the inlet of said generator, a supply line connected to the remaining port, and thermostatic means responsive to a temperature within said generator for operating said valve members from a position wherein the water supply line and said second conduit are interconnected to a position wherein the water supply line is connected to said third conduit and said second conduit is connected to said waste line, thereby simultaneously to effect discharge of water from the lower part of said tank, admission of hot water to the upper part of said tank, and admission of water to said generator.

LYMAN F. WHITNEY.
WILLIAM E. WHITNEY.
DANIEL F. COMSTOCK.

References Cited in the file of this patent

UNITED STATES PATENTS

| Number | Name | Date |
|---|---|---|
| 2,291,023 | Burklin | July 28, 1942 |
| 2,544,408 | Whitney et al. | Mar. 6, 1951 |